United States Patent [19]

Figwer

[11] 3,728,065

[45] Apr. 17, 1973

[54] DEVICE FOR THE PRODUCTION OF TUBE SOCKETS

[75] Inventor: Eduard Figwer, Vienna, Austria

[73] Assignee: Inteco Establishment, Vaduz, Liechtenstein

[22] Filed: Nov. 3, 1970

[21] Appl. No.: 86,514

[52] U.S. Cl. ............... 425/392, 249/178, 249/185, 264/291
[51] Int. Cl. ............................................. B28b 11/08
[58] Field of Search ............... 18/2 S, 14 S, 19 TM, 18/19 TC, 19 TE, 42 R, 42 H, 45 R, 46, DIG. 33, DIG. 58; 25/39, 128 RR, 36; 72/115, 317; 264/291, 292; 249/83, 175, 177, 178, 185, 215; 425/392, 403, 393

[56] References Cited

UNITED STATES PATENTS

| 3,377,659 | 4/1968 | Hucks | 18/19 TE |
| 3,474,999 | 10/1969 | Shupe | 18/45 R X |
| 176,084 | 4/1876 | Snider | 249/175 |
| 2,933,764 | 4/1960 | Branick | 25/128 RR |
| 3,343,220 | 9/1967 | Martinek | 18/DIG. 33 |

*Primary Examiner*—H. A. Kilby, Jr.
*Attorney*—Singer, Stern & Carlberg

[57] ABSTRACT

A device for producing tubular sockets provided with an outwardly extending annular enlargement and made of plastic material comprises a removable annular core having a diameter equal to the desired inner diameter of the socket and a ring on said core for forming said enlargement, said ring being removably mounted on said core. The ring is subdivided into at least three segments which are hingedly connected with each other, except that the abutting ends of two segments are bevelled and form sharp points and are merely clamped together, so that after the removal of the core from the socket which has been molded on the combined core and ring, the latter may be collapsed by swinging the segments of the same inwardly about their hinges into bore of the socket and then may be removed from the bore, because the largest dimension of the collapsed ring is smaller than the diameter of the bore in the socket formed by the cylindrical core.

6 Claims, 6 Drawing Figures

INVENTOR.
Eduard Figwer
BY
Singer, Stern & Carlberg
ATTORNEYS

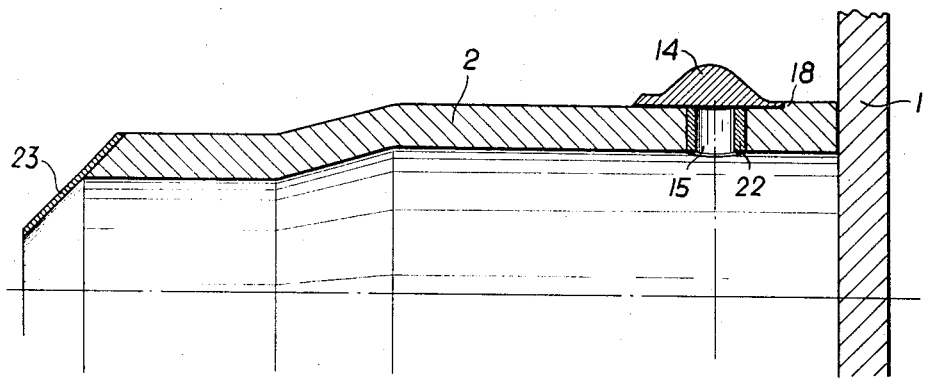
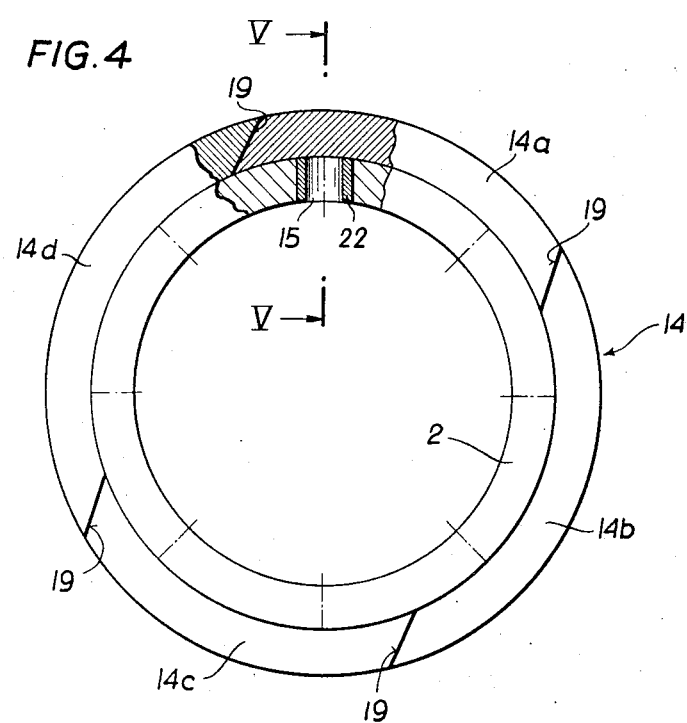

DEVICE FOR THE PRODUCTION OF TUBE SOCKETS

The invention refers to a device for the production by means of a multipartite core of tube sockets consisting of plastics material and being provided with an annular enlargement, the greatest diameter of which exceeds the diameter of the socket as measured laterally of said enlargement. Such a tube socket may be provided on one end of a tube, but it is also possible to produce a tube socket independently from a tube.

When giving a tube socket of plastics material the desired inner shape deviating from the circular-cylindrical shape, the tube end or, respectively, the tubular part to be deformed is shifted in a still plastic condition over a correspondingly shaped core. In view of the non-cylindrical shape of the inner surface of the socket, this results in difficulties when removing the core from the socket. When pulling off the tube socket from the core while the tube socket is still in a plastic condition, the tube socket is uncontrollably deformed. In a sufficiently cold and rigid condition, the tube socket can no longer be pulled off the core if the height of the enlargement exceeds a minimum size making the required elastic deformation impossible. Therefore, in known devices of the kind described, expensive cores have to be used, in which the protruding core portions are movably connected with the basic portion of the core such that after forming the tube socket the protruding core portions can be lowered into the basic core portion. A known device of this type is provided with a plurality of small blocks which may be shifted in radial direction when shifting a central cone in axial direction thereof. The wreath of small blocks is enclosed by a ring of elastic material cooperating with an annular groove of an outer mould to be shifted over the tube end or the tubular piece to be given the shape of a socket. In a similar known device, retractable core portions forming a ring expandable in the manner of a telescope are expelled from the basic portion of the core by means of a gear and level drive after shifting the heated end of a tube of thermoplastic material over the basic portion of the core. The main disadvantage of these known devices consists in the high constructional expenditure for the mechanical drive of the movable core portions.

It is further known to use a dismantlable expansion-prong when forming a tube socket showing an annular enlargement at selected areas at one end of a tube. Said expansion-prong consists of a cylindrical central portion and of a bushing subdivided into segments and being arranged to be pulled off the central portion. This dismantlable bushing has a length corresponding to the whole length of the bushing, and it defines the inner shape of the socket in the area of the annular enlargement as well as in the area of the smooth inner surface of the socket. Such a device suffers from the drawback that the expansion-prong becomes complicated and heavy-weighted. This is particularly true when working large diameter tubes, as the segment-shaped parts are much more difficult to handle than one single cylindrical part. Furthermore, it is a disadvantage that the joint gaps between the individual segments are reproduced on the smooth socket portions. There has also been proposed a process for forming a socket on a tube consisting of thermoplastics, wherein the tube end to provided with the socket is heated to a thermoplastic condition, and then a cylindrical core, the outer diameter of which corresponds to the smallest inner diameter of the socket to be formed, and on which core at least one ring of rigid material is arranged, is inserted into the heated end of the tube, whereupon, after solidification of the socket thus formed, the cylindrical core is pulled out of the socket and the ring. With this process, it is also possible to arrange on the core in addition to the ring of rigid material, which ring remains within the socket, at least one sealing ring or an auxiliary ring which is to be removed from the socket after forming said socket. An auxiliary ring of this kind, which is to be a ring of elastic, but hard material for providing elastic deformability in inward direction and thus the possibility to be removed from the socket, particularly serves the purpose of maintaining the exact distance between two rings of rigid material, which are to remain within the socket, so as to provide an annular gap for the subsequent insertion of a sealing ring. The auxiliary ring of this known device therefore does not affect the plastic deformation of the socket wall when forming an annular enlargement therein, so that it need not have a dimensionally stable outer surface of special design.

It is therefore a main object of the present invention to provide a device for forming tube sockets consisting of plastics material and being provided with an annular enlargement, and to give such a device a design which facilitates its operation, thus preventing the drawbacks of known devices. The invention essentially consists in that the core is formed by a ring subdivided into at least three segments and constituting an annular enlargement, and of an undivided cylinder carrying said ring, the outer surface of which corresponds to the inner surface of the annular enlargement to be formed, and forming those portions of the socket, the inner diameter of which maximally equals the inner diameter of the mouth of the socket, and in that the diameter of said cylinder at the portion not facing the mouth of the socket maximally equals the inner diameter of said ring. The core portion having the shape of a ring and being subdivided into segments thus forms only the annular enlargement of the socket, whereas all smooth portions of the socket are formed by the non-divided cylinder. Even with large diameter sockets, the weight of the ring subdivided into segments is always within such limits that the ring is easy to handle. In addition, the joint gaps can only be reproduced on the annular enlargement where they are not in the way as this annular enlargement serves for accommodating an annular seal.

After forming the socket, the non-divided cylinder is pulled out of the solidified socket, wherein the ring maintains its position within the socket. As the ring is composed of at least three segments, it can be made to collapse in inward direction, provided the joint interfaces between the engaging segments are formed such that the ring will not increase its diameter at any stage of its collapsing movement. This condition may easily be met, e.g., by giving at least one free end of two engaging free ends of the segments the form of a relatively sharp edge extending toward the outer circumference.

According to an advantageous embodiment of the invention, the non-divided cylinder is at the side of the ring facing the mouth of the socket provided with a shoulder acting as an abutment for said ring, the diameter of said shoulder being maximally equal to the inner diameter of the mouth of the socket. This shoulder engages the ring segments when the core is inserted into the tube to be provided with a socket without causing an obstruction when the cylindrical core portion is pulled out of the socket formed. Subsequently, the segments may easily be removed from the annular enlargement. According to the invention, the arrangement may be such that the segments are at all but one of their joints articulatedly connected for collapsing movement in inward direction, such that at any stage of the collapsing movement the outer diameter of the ring is not surpassed. This provides the advantage that the individual segments cannot be lost and all the segments can easily be brought into engagement with the cylindrical portion of the core. Conveniently, the arrangement is such that at the free ends of the segments of the ring a releaseable pull connection is provided which is independent from said cylinder.

If desired, the collapsed segments may be removed from the socket in an oblique position. However, conveniently the length of the segments as measured in a straight line between their ends does not surpass the diameter of the cylindrical core portion. This facilitates removal of the segments of the ring after the non-divided cylinder has been pulled out of the socket.

Segments consisting of, or containing, ferromagnetic material may be kept in engagement with the cylindrical core portion by permanent magnets embedded in the cylindrical core portion. Thus, the segments are fixed in their position on the cylindrical core portion but can be stripped thereof when pulling the cylindrical core portion out of the socket. If the segments of the ring are not articulatedly connected, it is sufficient to give the end faces of at least one segment a shape diverging relative to the axis of the core, for providing the possibility of easy removal of this segment from the annular enlargement. Subsequently, the other segments may be removed without difficulty.

The socket and, respectively, the end of a tube consisting of thermoplastic material can be brought into a plastic condition by suitably heating, and may then be shifted over the core. However, it is also possible to shift the tube and, respectively, the socket immediately after extrusion, i.e., in a still plastic condition, over the core and then to exert a sub-atmospheric pressure within the tube, thus tightly pressing the still plastic wall of the tube onto the core consisting of the cylindrical portion and the engaging ring. When using thermoplastics, the rough moulding is in a heated plastic condition shifted over the core consisting of the cylindrical portion and the ring segments. When forming a tube socket at the end of a tube, this end of the tube is shifted over the core of a device according to the invention. If a socket as such is to be formed, a tube portion of adequate length is shifted over the core.

The invention is further illustrated by embodiments shown in the drawing.

FIG. 4 and 5 show a further embodiment, FIG. 4 illustrating a transverse cross-section through the cylindrical core portion and the ring arranged thereon, and FIG. 5 representing a section along line V—V of FIG. 4.

Figure 1:
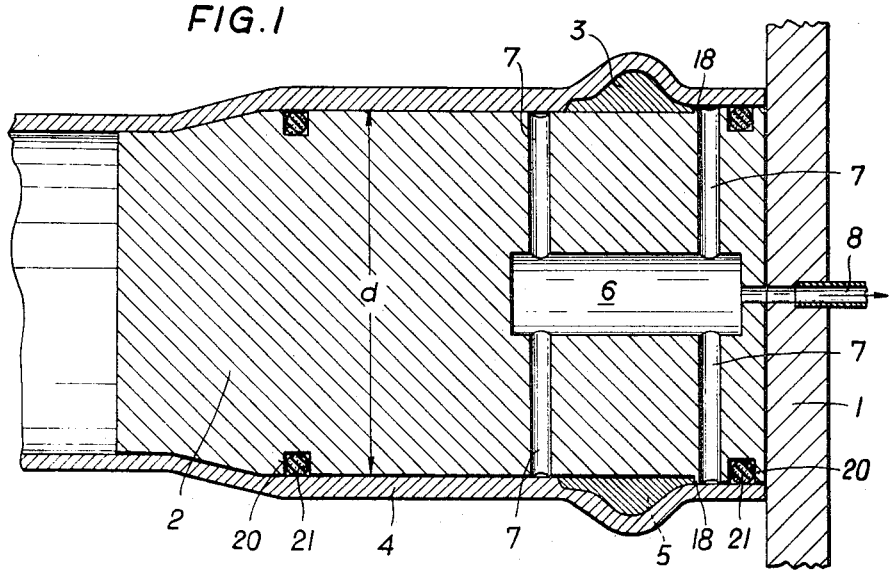
FIG. 1 represents a longitudinal section through the core with the socket thereon.

The cylindrical core portion 2 is fixed to a support 1 and carries a ring 3 composed of segments. Over the core consisting of the cylindrical core portion and the ring carried thereon, the tube consisting of thermoplastic material and heated to a plastic condition is shifted and thereby given the shape illustrated in the drawing. According to this shape, an annular enlargement 5 has been formed by the ring 3. When shifting the core into the tube, the ring 3 engages a shoulder 18 provided on the cylindrical core portion 2. The cylindrical core portion 2 is provided with an axial bore 6 from which radial bores 7 extend right to the outer surface of the cylindrical core portion 2. A pipe 8 is connected to said axial bore 6. The other end of pipe 8 may be connected to a vacuum source so that under the effect of sub-atmospheric pressure the tube 4 in a plastic condition may be tightly sucked onto the cylindrical core portion 2 and the ring 3. For providing more reliable operating conditions, annular grooves 20 are formed at the outer surface of the cylindrical core portion 2 and sealing rings, e.g., O-rings 21, are accommodated by said annular grooves 20. These sealing rings 21 provide an air-tight engagement between the socket 4 and the cylindrical core portion 2, but are under the influence of vacuum pressed into the annular grooves 20 without any deformation of the tube.

After sufficient solidification of the socket 4, the cylindrical core portion 2 is pulled out of the tube (or the socket formed thereon respectively), noting that the ring 3 maintains its position within the annular enlargement of the socket.

Figure 2:
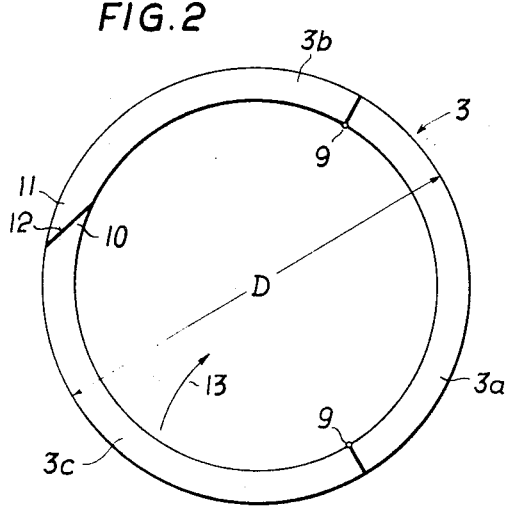
FIG. 2 illustrates the ring in its operating position on the cylindrical core portion.
Figure 3:
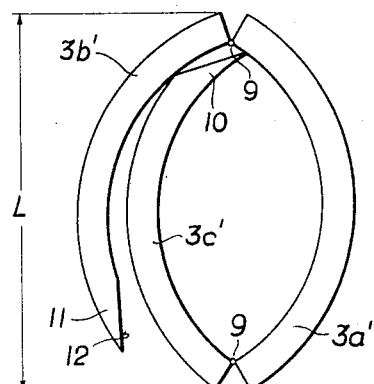
FIG. 3 represents the collapsed ring.
Figure 6:
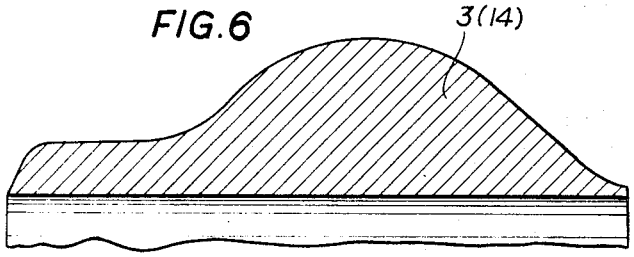
FIG. 6 illustrates the cross-sectional shape of the ring segments in an enlarged scale.

As is shown in FIG. 2, the ring 3 consists of three segments 3a, 3b, 3c connected by hinges 9. Of the two ends 10 and 11 of these segments, which ends are not hingedly connected, the end 11 terminates in a sharp edge 12 positioned at the outer circumference. Both ends 10 and 11 can be clamped together in order to prevent the ring 3 from being pushed over the shoulder 18 when the tube is shifted over the core. With this arrangement, the segment 3c can be made to collapse inwardly into the position 3c' shown in FIG. 3 without surpassing the outer diameter D of the ring 3. Subsequently, the segment 3b can also be made to collapse inwardly, and is brought into position 3b', also shown in FIG. 3. The secant line L of the segments is smaller than the diameter of the cylindrical core portion, i.e., smaller than the inner diameter d of the socket 4, so that the collapsed ring 3 can easily be removed from the socket. The collapsed condition of the ring is shown in FIG. 3.

According to the embodiment shown in FIG. 4 and 5, the ring 14 is subdivided into four segments 14a, 14b, 14c, 14d which are not hingedly connected. The cylindrical core portion 2 is provided with permanent magnets 15 embedded in this core portion. The ring segments 14a, 14b, 14c, 14d consist of ferromagnetic material, in the embodiment shown of iron, and are therefore retained in their position by the magnets 15.

The magnets 15 are inserted into the cylindrical core portion with interposition of brass plates 22 filling the pole gap. In the embodiment shown, eight such magnets may be evenly distributed over the circumference of the cylindrical core portion. The tube to be provided with a socket is shifted over the core in the direction of arrow 17, wherein the segments of the ring 14 are supported by a shoulder 18 of the cylindrical core portion at the side facing the mouth of the socket. Thus the segments are secured in their proper position.

The cylindrical core portion 2 is pulled out of the socket formed in the direction of arrow 17, wherein the segments of the ring 14 are quite easily stripped off the cylindrical core portion 2. The segments 14a and 14c have end faces 19 in parallel relation to each other, or diverging relative to the axis of the core, so that these segments may easily be removed from the annular enlargement. After removal of the segments 14a and 14c, the segments 14b and 14d may also be removed.

23 is a funnel-shaped protrusion of the cylindrical core portion 2 that facilitates shifting of the tube over the core.

What I claim is:

1. A device for producing in a plastics material tube socket having at least one open end an annular section of greater interior diameter than the adjoining portions of the socket at both sides of said annular section, comprising
   a. a cylindrical core member insertible into said tube socket from the open end thereof and having along a main portion of its length an outer diameter equal to the desired inner diameter of a portion of the tube socket extending longitudinally inwardly from the enlarged annular section to be produced, said main portion of the cylindrical core member also extending longitudinally outwardly through the width of said enlarged annular section and having at the outwardly end of said extension an annular shoulder of greater diameter than said main portion of the cylindrical core member but not greater than the open end portion of the tube socket,
   b. an annular core member surrounding said outwardly extension of the cylindrical core member and having a cross-section corresponding to that of said annular section of the tube socket, said annular core member abutting said annular shoulder and comprising at least three arcuate segments covering adjoining portions of the circumference of said extension of the main portion of the cylindrical core member and consisting at least partially of ferromagnetic material, and
   c. permanent magnets imbedded in said cylindrical core member for retaining said arcuate segments in operating position,
whereby upon formation of said enlarged annular section in plastic condition of the tube socket material said cylindrical core member may be withdrawn and said annular core member may be collapsed and withdrawn from the tube socket through said open end thereof.

2. A device for producing in a plastics material tube socket having at least one open end an annular section of greater interior diameter than the adjoining portions of the socket at both sides of said annular section, comprising
   a. a cylindrical core member insertible into said tube socket from the open end thereof and having along a main portion of its length an outer diameter equal to the desired inner diameter of a portion of the tube socket extending longitudinally inwardly from the enlarged annular section to be produced, said main portion of the cylindrical core member also extending longitudinally outwardly through the width of said enlarged annular section and having at the outwardly end of said extension an annular shoulder of greater diameter than said main portion of the cylindrical core member but not greater than the open end portion of the tube socket,
   b. an annular core member surrounding said outwardly extension of the cylindrical core member and having a cross-section corresponding to that of said annular section of the tube socket, said annular core member abutting said annular shoulder and comprising at least three arcuate segments covering adjoining portions of the circumference of said extension of the main portion of the cylindrical core member, and
   c. articulate connection means between said arcuate segments of the annular core member at all but one of the joints between them to enable collapsing movement in an inwardly direction of said annular core member, whereby upon formation of said enlarged annular section in plastic condition of the tube socket material said cylindrical core member may be withdrawn and said annular core member may be collapsed and withdrawn from the tube socket through said open end thereof.

3. A device as claimed in claim 2, including a releasable pull connection at the free ends of said arcuate segments which pull connection is independent of said cylindrical core member.

4. A device as claimed in claim 2, in which at least one of the free ends of the two interengaging arcuate segments of said annular core member terminates in a sharp edge in the region of the outer circumference of said annular core member.

5. A device as claimed in claim 2, in which the plane of the interengagement surfaces of the free ends of said arcuate segments defines with the secant line connecting the adjacent articulate connection means with the innermost edge of said interengagement surfaces an angle of less than 90°.

6. A device as claimed in claim 2, in which said arcuate segments consist at least partially of ferromagnetic material, while permanent magnets are imbedded in said cylindrical core member for retaining said arcuate segments in operating position.

* * * * *